(12) United States Patent
Kanevsky et al.

(10) Patent No.: US 6,974,081 B1
(45) Date of Patent: Dec. 13, 2005

(54) SMART BOOK

(75) Inventors: Dimitri Kanevsky, Ossining, NY (US); Mariusz Sabath, Scarsdale, NY (US); Jan Sedivy, Prague (CZ); Alexander Zlatsin, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 09/684,207

(22) Filed: Oct. 6, 2000

(51) Int. Cl.[7] .............................................. G06K 7/10
(52) U.S. Cl. ......................... 235/462.01; 235/462.07; 707/101
(58) Field of Search ........................ 707/2, 101, 102; 705/59, 57, 52; 235/462.07, 462.01, 375, 235/383, 385

(56) References Cited

U.S. PATENT DOCUMENTS

| | | | | |
|---|---|---|---|---|
| 5,629,980 A | * | 5/1997 | Stefik et al. | 705/54 |
| 5,742,039 A | * | 4/1998 | Sato et al. | 235/462.07 |
| 5,893,132 A | * | 4/1999 | Huffman et al. | 434/167 |
| 5,920,861 A | * | 7/1999 | Hall et al. | 707/102 |
| 5,956,034 A | * | 9/1999 | Sachs et al. | 345/776 |
| 5,991,876 A | * | 11/1999 | Johnson et al. | 705/54 |
| 6,006,332 A | * | 12/1999 | Rabne et al. | 705/51 |
| 6,098,056 A | * | 8/2000 | Rusnak et al. | 705/75 |
| 6,135,646 A | * | 10/2000 | Kahn et al. | 707/104.1 |
| 6,314,409 B2 | * | 11/2001 | Schneck et al. | 380/259 |
| 6,343,281 B1 | * | 1/2002 | Kato | 380/201 |
| 6,343,283 B1 | * | 1/2002 | Saito et al. | 380/201 |
| 6,405,203 B1 | * | 6/2002 | Collart | 382/205 |
| 6,434,535 B1 | * | 8/2002 | Kupka et al. | 380/228 |
| 6,486,780 B1 | * | 11/2002 | Garber et al. | 340/572.1 |

OTHER PUBLICATIONS

Harris, Brad et al. The Big Guide to Netscape Communicator 4, Sams.net Publishing pp. 1-4, 1997.*
Rioch, "Image reader for copying machine—permit reading for copying only when specified bar code is read out from book cover" JP05268415A Derwent 1999.*

* cited by examiner

Primary Examiner—Karl D. Frech
(74) Attorney, Agent, or Firm—Ohlandt, Greeley, Ruggiero & Perle, L.L.P.; Daniel P. Morris, Esq.

(57) ABSTRACT

A method and system that permits the purchase of a license to make a limited number of copies of a book. At the time of purchase, the purchaser or user is given a key that contains the ability to obtain the limited number of copies on demand. The key contains a web address that can be used to obtain the authorized copies. In some embodiments, the key is a label in a machine readable form that is readable by a label reader, such as a bar code reader or a magnetic reader. In other embodiments, the key is merely a web address that the user may contact. At the point of sale, the key or record is formed, affixed to the book and also sent to copy tracker. The copy tracker then keeps track of the copies as made and processes each request to make a copy. If permitted, a database is enabled to send an electronic image of the requested copy to the user.

30 Claims, 6 Drawing Sheets

SMART BOOK

BACKGROUND OF THE INVENTION

1. Field of the Invention

This invention relates to methods and systems for the copying of books, pages, pictures and the like.

2. Description of the Prior Art

The procurement of a book protected by copyright involves a purchase from the copyright proprietor or his or her agent. If the purchaser needs to have a copy of the book, a page thereof or a picture contained therein, the copy or a right to make the copy must be procured. Sometimes, a reprint may be available from the publisher. However, a right to make a copy must be obtained from the publisher or its agent. In the past, copies have been authorized from the book itself via a copy machine. This procedure can be very time consuming if the number of pages to be copied is large.

Another possible solution to giving a right to make a copy is to provide an electronic image of the book or a part thereof for reproduction to the person requesting the copy. However, copyright proprietors are reluctant to put an electronic image in the hands of someone who wants to make a copy without secure safeguards that will prevent access to others and limit the number of copies that can be made.

What is needed is a process that makes a right or license to make copies available that permits a user to make human readable copies from of an electronic image of the copyrighted material with proper safeguards to the copyright proprietor.

SUMMARY OF THE INVENTION

The present invention satisfies this need with a method and system that permits the purchase of a right to make a limited number of copies of a book. At the time of purchase, the purchaser or user is given a key that contains the ability to obtain the limited number of copies on demand. The key contains a web address that can be used to obtain the authorized copies. In some embodiments, the key is a label in a machine readable form that is readable by a label reader, such as a bar code reader or a magnetic reader. In other embodiments, the key is merely a web address that the user may contact.

The present invention provides a smart book that has a record or key affixed to the book. The record includes two or more of the following data items: a title of said book, a web address of a copy tracker for said book, an identity of said order, a first number of copies of said entire book that are permitted to be made, a second number of copies of pages of said book that are permitted to be made and a third number of copies of pictures of said book that are permitted to be made.

In one aspect of the invention, a semiconductor device is affixed to the book and the record is stored in a memory of the semiconductor device. The semiconductor device also includes a controller and a communication module that enables communication with a device that can communicate with the world wide web, such as a personal computer, telephone, personal organizer, and the like.

The present invention further provides a method and/or system at the point of sale. The method encodes the label with a record that identifies the book, the right to make copies, the number of authorized copies and the web address of a copy tracker. The record is sent to the copy tracker and the label is given to the purchaser. In some embodiments, the label is applied to the book that is also purchased by the user. In other embodiments, the key or label is given to the user either electronically, or in hard copy form that is machine readable as a bar code or a magnetic stripe or is in human readable form.

The present invention further provides a method and system for keeping track of the right to make and the copies that have been made. This method maintains the record and responds to a request to make a copy by comparing the request to the record to determine if a copy is permitted. If so, the method enables the presentation of an electronic image of the book to the user. In some embodiments, the copy is contained in a database and the database is enabled to present the electronic image to the user via the world wide web. The method then adjusts a count process contained in the record of copies authorized by the right to make and copies already made.

The invention further provides a method of obtaining a copy that is authorized by the right to make. This method determines a web address of a copy tracker for the right to make copies of the book. A request to make a copy of the book is then sent to the copy tracker. The request identifies the book, the right to make and the pages to be copies. An electronic image of the pages is obtained from the copy tracker and a human readable image is prepared for display or for a hard copy reproduction.

In one embodiment, the user procures a book with a chip or semiconductor device that contains the copy tracking ability for the right to make copies. The chip is responsive to requests received from an input device, for example, a personal computer to make a copy of one or more pages. The copy tracker compares the request to the number of authorized copies and the number of copies already made to determine if the requested copy is permitted. If so, the chip provides the user's personal computer with the web address to obtain an electronic image from which to make copies. If not, the chip does not provide the web address.

In some embodiments, the chip itself contains a copy of the book. In these embodiments, if the copy tracker determines that a requested copy is permitted, an electronic image thereof is provided to the user's personal computer.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

Figure 1:
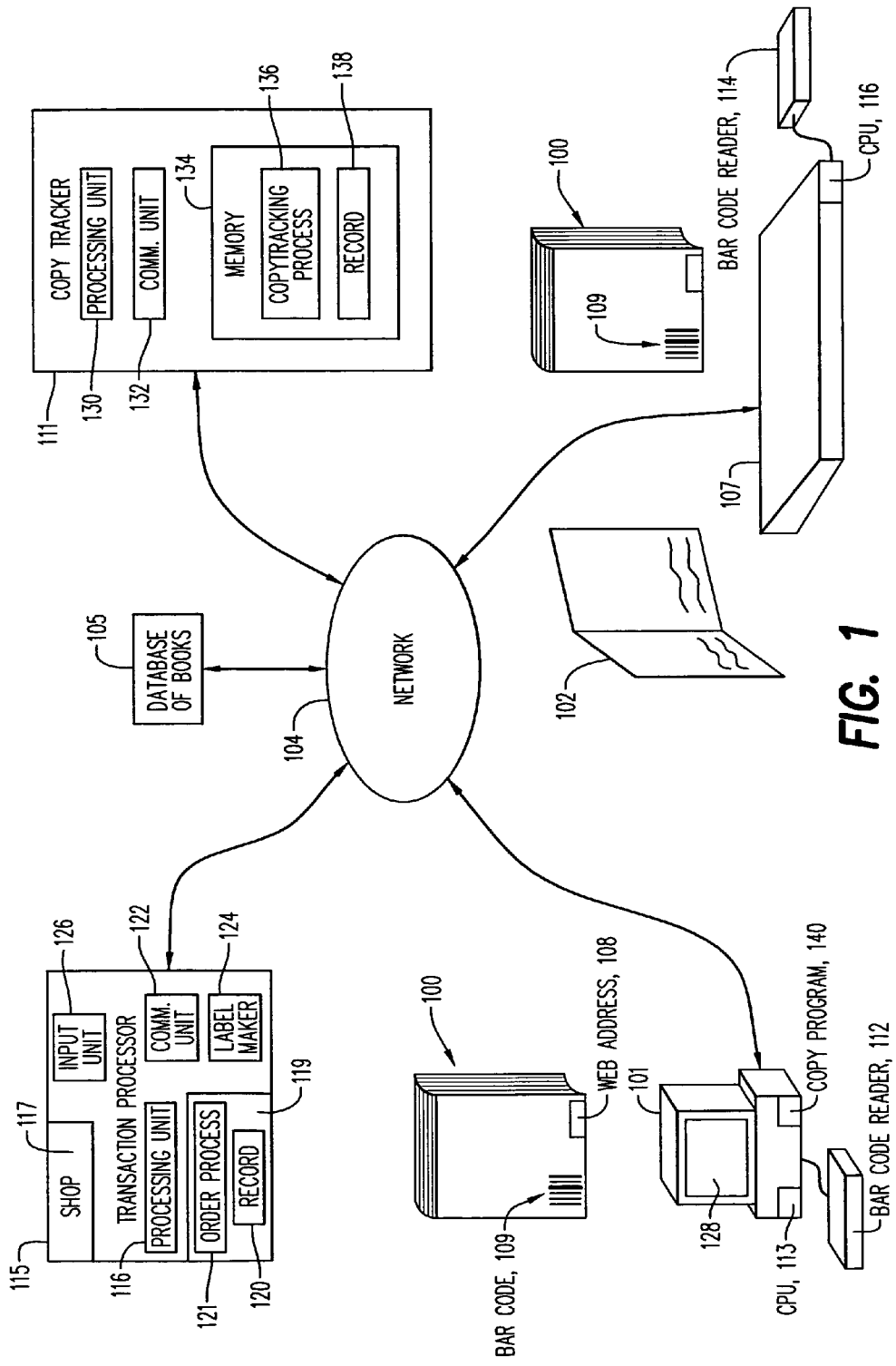
FIG. 1 is a block diagram of the system of the present invention.

Referring to FIG. 1, a smart book 100 is shown with a shop 115, a copy tracker 111, a database 105 and a plurality of copy stations shown as a computer 101 and a printer 107. When a purchaser or user procures smart book 100 at shop 115, a right or license to make a limited number of copies is also procured. A label 109 that contains license data that identifies copy tracker 111 (e.g., a web address) and the specific license is affixed to smart book 100. The license data can be encoded on label 109 in any suitable machine readable form, such as a bar code, a magnetic medium, a watermark and the like. The license data in human readable form may also be placed on a label 108 that may be affixed to smart book 100. Label 109 is affixed to a cover or binder of smart book 100 or to one or more pages thereof, as shown on a page 102 of smart book 100. When affixed to a specific page 102, the license data will also identify the specific page.

When the user wants to make a copy of one or more pages of smart book 100, label 109 is read by one of the copy stations, say computer 101, which then establishes a connection via a network 104 with copy tracker 111. Copy tracker 111 verifies the specific license and determines if the copy being requested is permitted. If so, copy tracker 111 enables an electronic image of the requested copy to be presented by database 105 to the user via network 104 to computer 101. Database 105 contains copies of a plurality of books, including smart book 100. Database 105 may be located at the same or a different web address than that of copy tracker 111. Network 104 may be any suitable communication network, such as the Internet or World Wide Web.

Shop 115 may be a brick and mortar shop that is visited personally, a virtual shop that is visited via network 104 or a combination of both. Shop 115 has a transaction processor 117 that includes a processing unit 116, an order process program 121, a record 120, a label maker 124, an input unit 126 and a communication unit 122. Order process program 121 controls processing unit 116 to make record 120 of a right to make copies being procured for smart book 100. The right to make data may be entered via input unit 126. Alternatively, record 120 may contain standardized terms and be one of a plurality of records 120 that differ from one another only in license identification, such as an agreement number.

Figure 3:
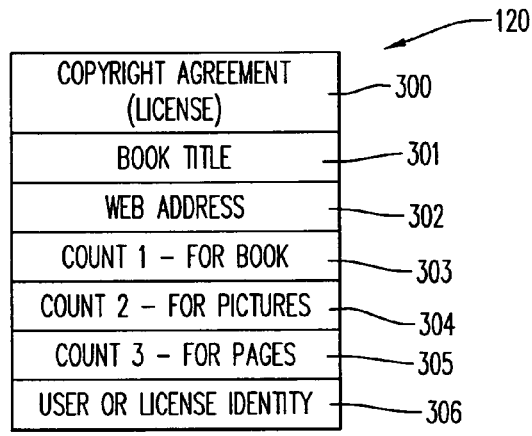
FIG. 3 depicts a record of a copyright right.

Referring to FIG. 3, record 120 includes a general license agreement data 300, a title 301 of smart book 100, a web address 302 of copy tracker 111, a book count number 303, a picture count number 304, a page count number 305 and a user or license identity 306.

Referring again to FIG. 1, when record 120 is complete, it is affixed to smart book 100 for delivery to the purchaser. Also, record 120 is then sent to copy tracker 111 via network 104 or any other suitable communication network, such as plain old telephone service.

Figures 5, 6:
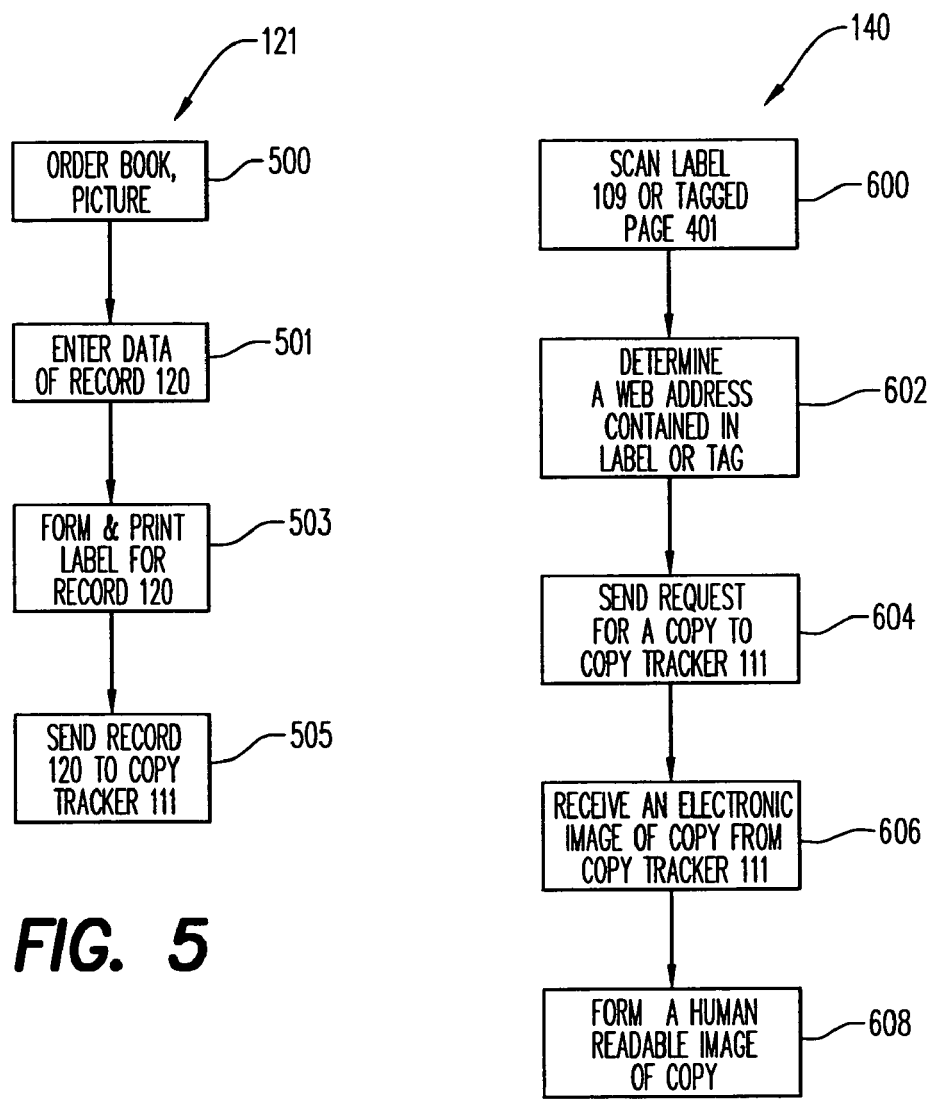
FIG. 5 is a flow diagram of the order procedure of FIG. 1.
FIG. 6 is a flow diagram of a copy procedure of FIG. 1.

Referring to FIG. 5, order process program 121 begins at step 500 with entry of an order for the right or license to make copies. Step 501 obtains and enters the data of record 120 for the desired book. Step 501, for example obtains web address 302 from a directory or by searching the web. Step 503 forms and prints label 109 for record 120. Step 505 sends record 120 to copy tracker 111.

Referring again to FIG. 1, to make a copy of smart book 100, or a picture or page thereof, label 109 is read by a reader, such as bar code reader 112 that communicates with computer 101 via a wired or a wireless link. Web address 302 is used by computer 101 to send a request for copy to copy tracker 111. The request for copy may be for the entire book, a page or a picture. If for the entire book, the label is read from the cover or binder. If for a particular page, the label is read from that page. If for a picture, the label is read from the area of the picture. In each case, the record contains an identity of the book, the page, or the picture, as the case may be. For the case where the label is watermark, a suitable watermark reader must be provided. For example, a watermark reader is described in pending U.S. patent application Ser. No. 09/436,163, filed on Nov. 9, 1999, and assigned to the assignee of this application.

Copy tracker 111 determines if the requested copy is permitted and, if so, enables database 105 to present an electronic image of the requested copy to computer 101. As shown, computer 101 has a processing unit 113, a display 128 a copy program 140. The user can then view the requested copy on display 128. That is, computer 101 is a view only copy station. It will be apparent to those skilled in the art, that computer 101 can be connected with a printer that enables printing a hard copy of the electronic image of the requested copy.

Figure 4:
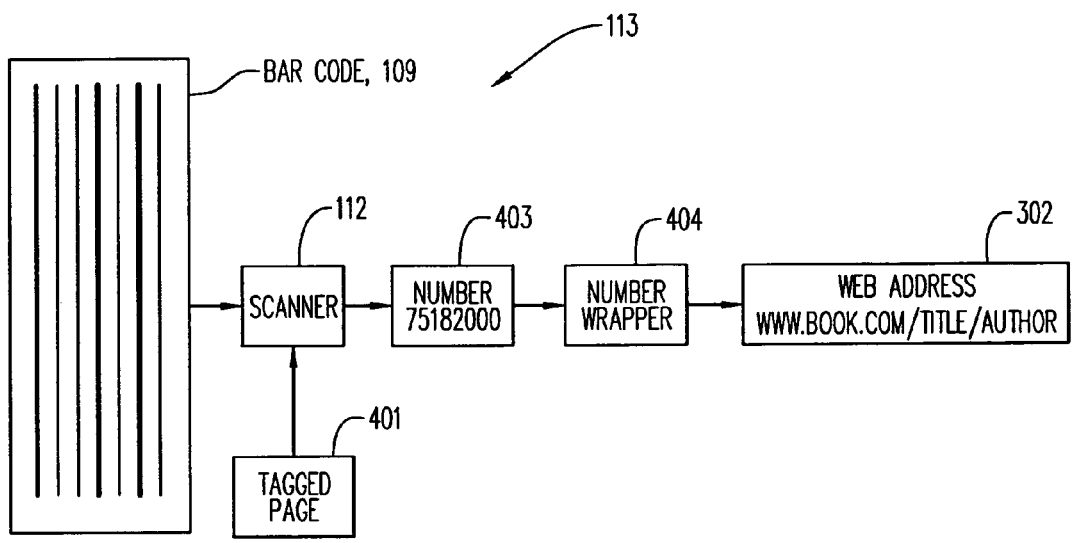
FIG. 4 is a block diagram, in part and a flow diagram, in part, of a number decode utility for a copy station of FIG. 1.

Referring to FIG. 4, when label 109 is read by bar code reader 112, an encoded number 403 is obtained that represents web address 302. Encoded number 403 is decoded by a number mapper 404 to derive web address to obtain web address 302 that is used by computer 101 to communicate with copy tracker 111. Number mapper 404 is a utility included in or used by copy program 140 of computer 101. FIG. 4 also shows the case where a tagged or labeled page 401 is read by bar code reader 112. The tag or label may be formed of a bar code or a pixel and affixed to page 401 by stamping adhesive label and the like.

Referring to FIG. 6, copy program 140 begins with step 600 which scans label 109 or tagged page 401. Step 602 determines a web address contained in label 109 or the tag of tagged page 401. Step 604 sends the request for copy to copy tracker 111. Step 606 receives an electronic image of the requested copy from copy tracker 111 or database 105. Step 608 forms a human readable image of the requested copy for viewing on display 128.

Figure 8:
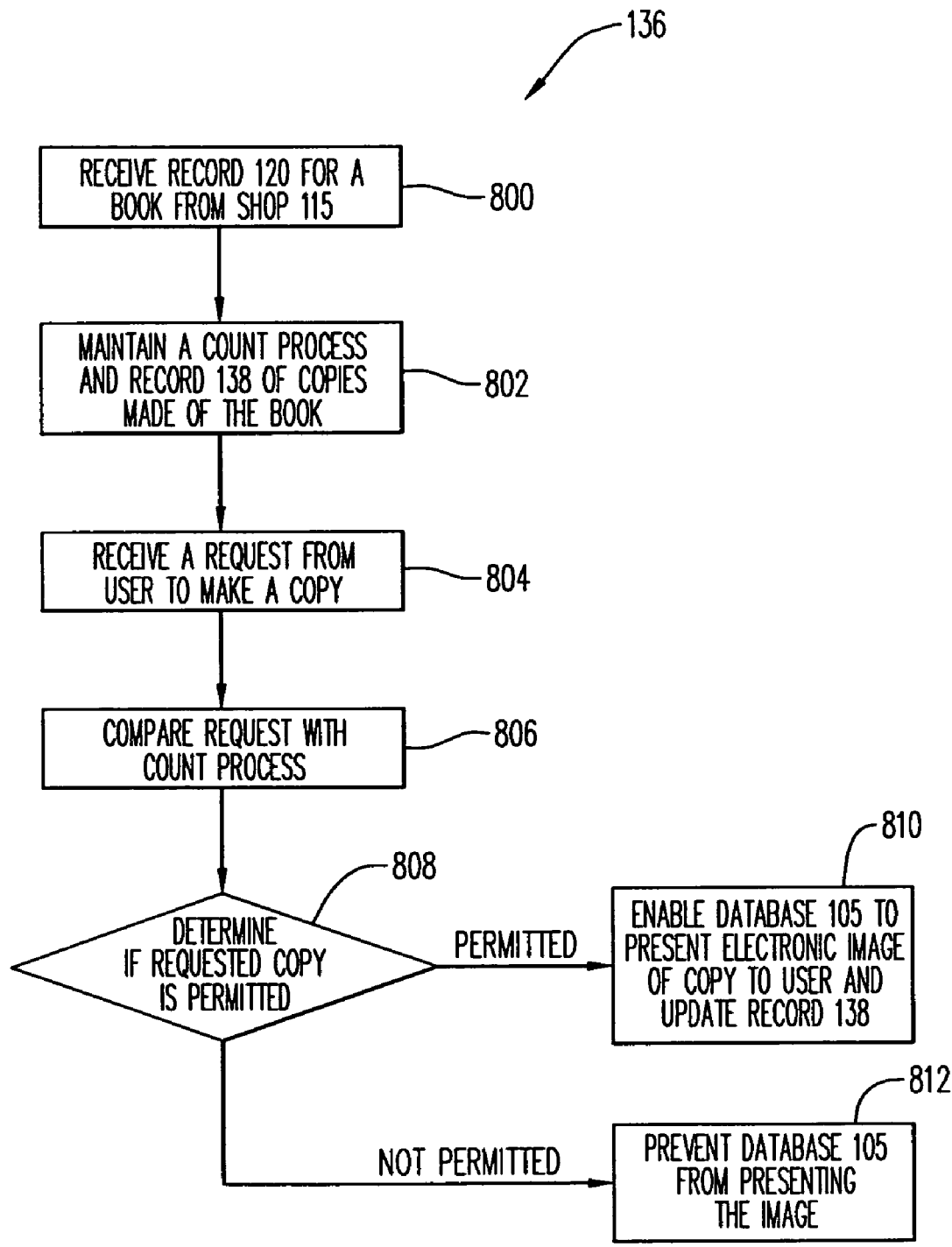
FIG. 8 is a flow diagram of a copy tracking procedure of FIG. 1.

Referring again to FIG. 1, copy tracker 111 includes a processing unit 130, a communication unit 132 and a memory 134. A copy tracking process or program 136 and a count record 138 is stored in memory 134. Count record 138 includes record 120 and a record of how many copies have been made. Referring to FIG. 8, copy tracking process 136 begins at step 800 with a receipt of record 120 for a book from shop 115. Step 802 maintains a count process and record 138 to keep track of the number of copies made. The next step 804 processes a new request for copy. Step 806 compares the new request with record 138. Step 808 determines if the current count of copies made permits the requested copy to be made. If so, step 810 enables database 105 to present an electronic image of the requested copy to the user and record 138 is updated to reflect a new copy count. If the requested copy is not permitted, step 812 prevents database 105 from presenting the electronic image of the requested copy.

Figure 2:
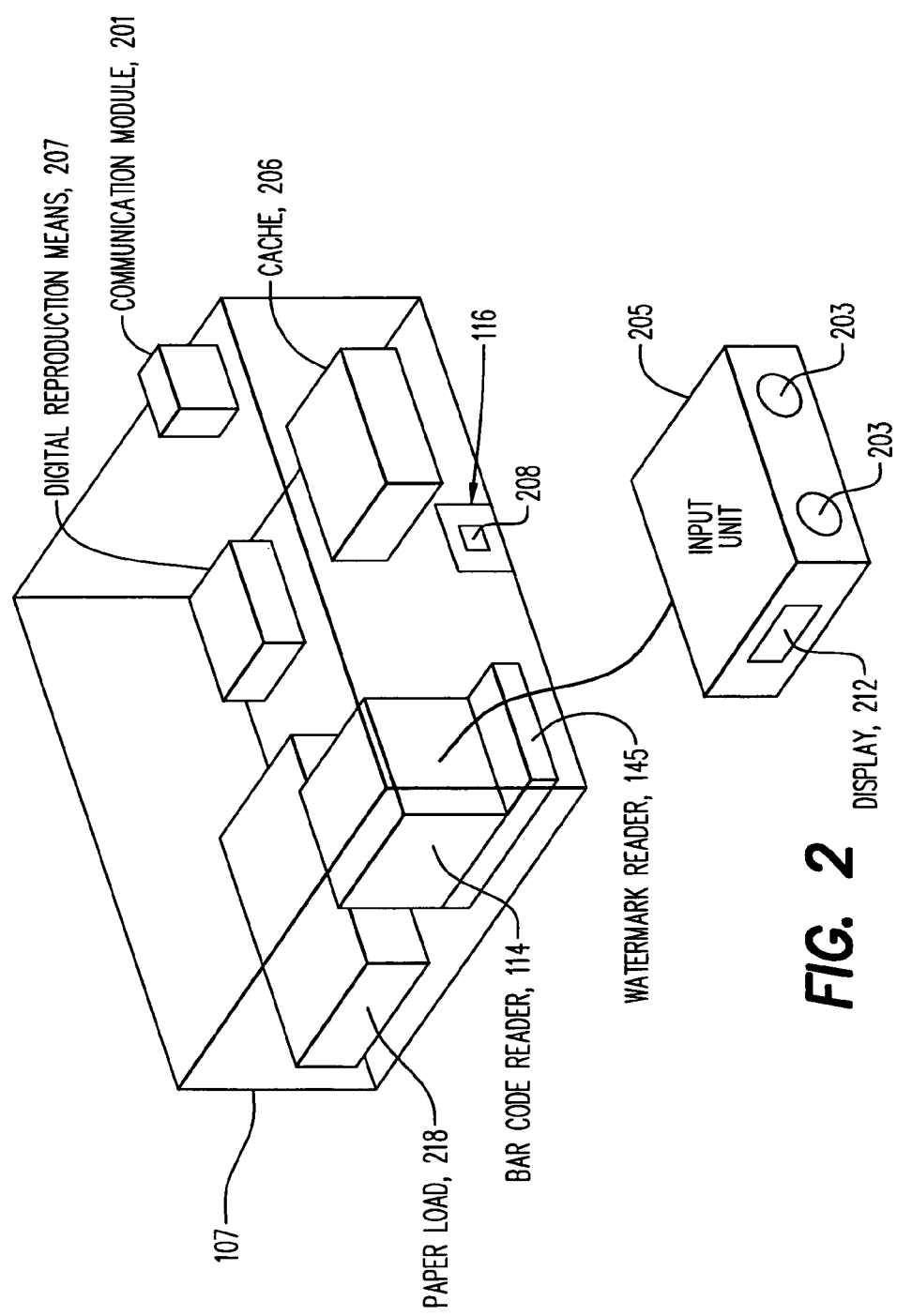
FIG. 2 is a perspective view and block diagram of a printer copy station of the FIG. 1 system.

Referring to FIGS. 1 and 2, printer 107 is an alternative copy station with a capability of reading label 109, communicating with copy tracker 111 and printing a human readable image of a requested copy. To this end, printer 107 has a bar code reader 114, a watermark reader 145, a processing unit 116, an input unit 205, a communications module 210, a digital reproduction means 207, a cache 206 and a paper load 210. Input unit 205 includes a plurality of input keys or buttons 203 and a display 212. The user can enter via keys 203 a request to copy all of book 100, a page or a range of pages or a picture. This entered request data is presented on display 212. The use of entered page or picture data at the copy station eliminates the need to put individual labels on each page 102 of book 100.

A managing process or program 208 controls processing unit 116 to process data read by bar code reader 114 from label 109 and to form a request to copy. Managing program 208 also communicates the request to copy tracker 111 via communication module 201 and controls the printing of the human readable image of the requested copy. If the requested copy is permitted by copy tracker 111, the electronic image thereof presented by database 105 is stored in cache 206. Managing program 208 then operates paper load 210 and digital reproduction unit 207 to print the requested copy in human readable form. When a new request for a copy is subsequently received and the copy is in cache 206, managing program 208 communicates this to copy tracker 111. If the copy is permitted, copy tracker 111 sends printer 107 a message that enables copy managing program 208 to use the copy in cache 206 to make the requested copy. This avoids a download of the requested copy from database 105.

Figure 7:
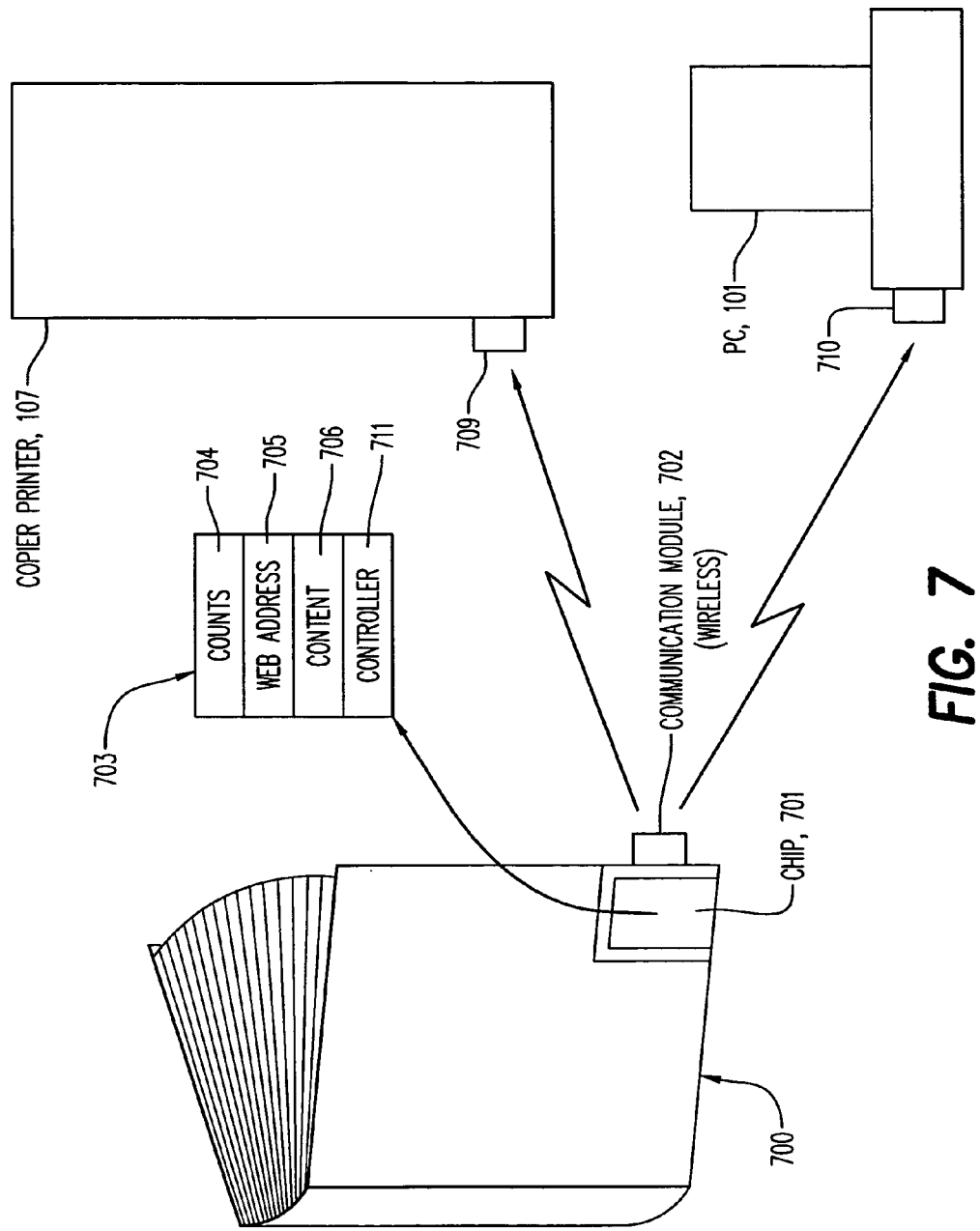
FIG. 7 is a block diagram of an alternate embodiment of the present invention.

Referring to FIG. 7, an alternative embodiment of the present invention is a smart book 700 that includes a semiconductor device or chip 701 affixed thereto. Chip 701 includes a record 703 of the right or license to make copies of smart book 700. Record 703 includes a counts data 704 and a web address 705 of copy tracker 111. Record 703 also includes other identifying data of the license and/or user necessary for copy tracker 111 to match a copy request with its record that corresponds to the license right. Chip 702 includes a controller 711 that communicates either by a wired or a wireless link with a copy station such as printer 107 or computer 101. To request a copy of smart book 700, or a part thereof, the user enters the request in printer 107 or computer 101, as the case may be, which then communicates with chip 701 via communication modules 709 or 710 to obtain from chip 701 the data contained in record 703. The copy station then forms and sends the request to copy tracker 111 for processing as described herein for the embodiments of FIGS. 1 through 6 and 8.

An alternate embodiment of chip 701 includes a content 706 of smart book 700. This allows the user to obtain the requested copy from content 706 if copy tracker 111 approves the requested copy. In still other embodiments, controller 701 could have its own copy tracking program, which will avoid the need to communicate with copy tracker 111. When the user has made all of the permitted copies, controller 701 will prevent other copies from being made.

The present invention having been thus described with particular reference to the preferred forms thereof, it will be obvious that various changes and modifications may be made therein without departing from the spirit and scope of the present invention as defined in the appended claims.

What is claimed is:

1. A method of authorizing one or more requested copies of all or part of a book comprising:
   retrieving copy rights information for authorizing copies of all or part of said book, wherein said copy rights information is stored in a semiconductor device affixed to said book,
   authorizing the requested copies if the retrieved copy rights information indicates that the requested copies are authorized; and
   updating the copy rights information stored in said semiconductor device to reflect that the requested copies have been authorized.

2. The method of claim 1 wherein said copy rights information comprises counts data specifying a number of copies that can be authorized, and wherein said updating comprises reducing said counts data in dependence on requested and authorized copies.

3. The method of claim 2 wherein said counts data further specifies a number of copies of said book, and/or copies of pages in said book, and/or copies of graphics in said book that can be authorized.

4. The method of claim 2 wherein said copy rights information further comprises a user or license identity.

5. The method of claim 1 wherein said steps of retrieving, authorizing, and updating are performed by a program that is executed by said semiconductor device.

6. The method of claim 5 wherein said authorizing step further comprises said semiconductor device communicating externally a signal authorizing the requested copies.

7. The method of claim 6 further comprising making the requested copies in response to said externally communicated signal.

8. The method of claim 1 wherein said steps of retrieving, authorizing, and updating are performed by a program that is executed by a system external to said semiconductor device.

9. The method of claim 8 wherein said retrieving and updating step further comprise said semiconductor device fetching and storing, respectively, all or part of said copy rights information, and also communicating externally with said external system all or part of said copy rights information.

10. The method of claim 8 wherein said copy rights information further comprises a World Wide Web address of said external system.

11. A book comprising:
    one or more pages having text and/or graphics, and
    an affixed semiconductor device comprising:
       an updateable storage area that stores copy rights information for authorizing copies of all or part of said book; and
       a controller for communicating externally to said semiconductor device.

12. The book of claim 11 wherein said copy rights information comprises counts data specifying a number of copies that can be authorized.

13. The book of claim 12 wherein said counts data further specifies a number of copies of said book, and/or copies of pages in said book, and/or copies of graphics in said book that can be authorized.

14. The book of claim 11 wherein said copy rights information further comprises a user or license identity.

15. The book of claim 11 wherein an external system, in response to a request for one or more copies of part or all of said book,
    communicates with said semiconductor device to retrieve all or part of said copy rights information stored in said semiconductor device,
    authorizes the requested copies if the retrieved copy rights information indicates that the requested copies are authorized; and
    communicates with said semiconductor device to update said copy rights information stored in said semiconductor device to reflect that the requested copies have been authorized.

16. The book of claim 15 wherein said copy rights information comprises counts data specifying a number of copies that can be authorized, and wherein said updating comprises reducing said counts data in dependence on requested and authorized copies.

17. The book of claim 11 wherein said semiconductor device, in response to a request for one or more copies of all or part of said book, further retrieves all or part of said stored copy rights information, communicates externally to said semiconductor device a signal authorizing the requested copies if the retrieved copy rights information indicates that the requested copies are authorized; and updates said stored copy rights information to reflect that the requested copies have been authorized.

18. The book of claim 17 wherein said copy rights information comprises counts data specifying a number of copies that can be authorized, and wherein said updating comprises reducing said counts data in dependence on the requested and authorized copies.

19. The book of claim 17 wherein said semiconductor device further comprises a storage area for all or part of the content of said book, said content being communicated externally in response to an authorized copy request.

20. The book of claim 17 wherein an external copy station that, in response to a signal authorizing requested copies received from said semiconductor device, retrieves the content of the requested copies, and produces the requested copies from the retrieved content.

21. The book of claim 20 wherein said semiconductor device further comprises a storage area for all or part of the content of said book, said content being externally communicated to said copy station.

22. The book of claim 11 comprising a plurality of affixed semiconductor devices, each comprising an updateable storage area that stores copy rights information for a section of said book.

23. A book copying system comprising:

a book comprising:

one or more pages having text and/or graphics, and an affixed semiconductor device comprising (i) an updateable storage area that stores copy rights information for authorizing copies of all or part of said book and (ii) a controller for communicating externally to said semiconductor device, and for, in response to a request for one or more copies of part or all of said book, retrieving all or part of said stored copy rights information, communicating externally to said semiconductor device a signal authorizing the requested copies if the retrieved copy rights information indicates that the requested copies are authorized, and updating said stored copy rights information to reflect that the requested copies have been authorized; and a copy station that can operatively communicate with said book for producing copies in response to said authorization signal.

24. The system of claim 23 wherein said semiconductor device further comprises a storage area for all or part of the content of said book, said content being externally communicated to said copy station.

25. The system of claim 23 wherein said copy rights information comprises counts data specifying a number of copies that can be authorized, and wherein said updating comprises reducing said counts data in dependence on the requested and authorized copies.

26. The system of claim 23 wherein said counts data further specifies a number of copies of said book, and/or copies of pages in said book, and/or copies of graphics in said book that can be authorized.

27. The system of claim 23 wherein said copy rights information further comprises a user or license identity.

28. A computer readable medium comprising instructions encoded thereon for causing a semiconductor device affixed to a book to perform a method of authorizing one or more requested copies of all or part of a book, said method comprising:

retrieving copy rights information for authorizing copies of all or part of said book, wherein said copy rights information is stored in a semiconductor device affixed to said book, authorizing the requested copies if the retrieved copy rights information indicates that the requested copies are authorized; and updating the copy rights information stored in said semiconductor device to reflect that the requested copies have been authorized.

29. A book comprising an affixed device comprising a computer readable storage area that stores copy rights information, said copy rights information comprising data specifying a number of copies of all or part of said book that can be authorized, and said storage area being updateable so that said data can be reduced in dependence on requested and authorized copies, wherein said affixed device fetches and sends all or part of said stored copy rights information to an external system and receives and stores updated copy rights information from said external system, wherein said external system authorizes requested copies if the retrieved copy rights information indicates that the requested copies are authorized and updates said copy right information in dependence on requested and authorized copies.

30. A book comprising an affixed device comprising a computer readable storage area that stores copy rights information, said copy rights information comprising data specifying a number of copies of all or part of said book that can be authorized, and said storage area being updateable so that said data can be reduced in dependence on requested and authorized copies, wherein said affixed device retrieves all or part of said stored copy rights information, communicates externally a signal authorizing one or more requested copies if the retrieved copy rights information indicates that the requested copies are authorized, and stores copy rights information updated in dependence on requested and authorized copies.

* * * * *